United States Patent [19]
Nishida

[11] Patent Number: 5,611,926
[45] Date of Patent: Mar. 18, 1997

[54] WATER TREATMENT DEVICE

[76] Inventor: Tetsuo Nishida, Shinkawa 5-17-4, Mitaka-shi, Tokyo, Japan

[21] Appl. No.: 372,249

[22] Filed: Jan. 13, 1995

[51] Int. Cl.⁶ .................................................. B01D 21/26
[52] U.S. Cl. ........................ 210/512.3; 210/784; 210/787; 210/242.3; 210/402; 210/523
[58] Field of Search ..................... 210/619, 628, 210/784, 787, 512.1, 512.3, 402, 523, 922, 923, 242.3, 416.1; 366/263, 265

[56] References Cited

U.S. PATENT DOCUMENTS 5,246,583  9/1993  Nishidi .................................. 210/512.3

Primary Examiner—David A. Reifsnyder
Attorney, Agent, or Firm—Oblon, Spivak, McClelland, Maier & Neustadt, P.C.

[57] ABSTRACT

Described is a water treatment device which comprises a) a treatment tank with an inlet and an outlet for the treatment water, and a rotating drum used for forced generation of a primary current and a secondary current accompanying the primary current in the treatment water in the treatment tank. The device can be used for the collection and removal of oil and/or other suspended matter in the treatment water through the rotating action of the rotating drum.

10 Claims, 14 Drawing Sheets

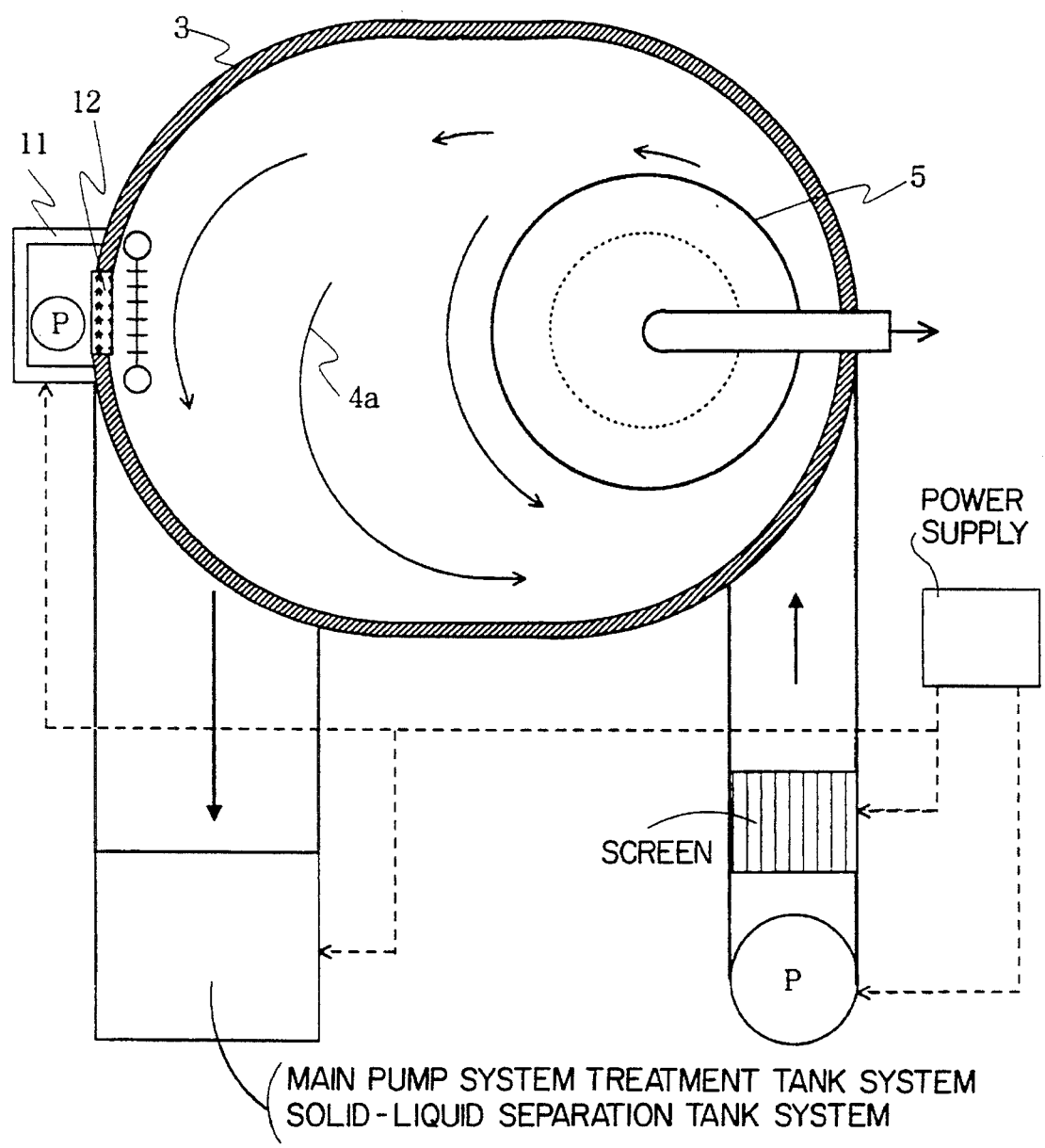

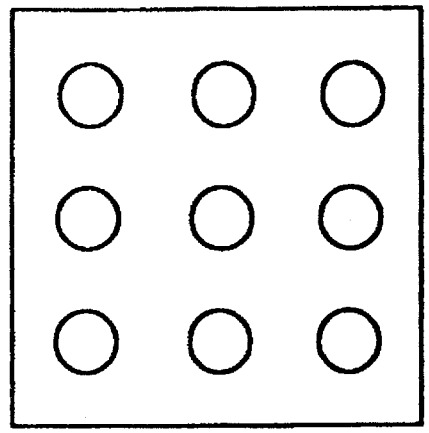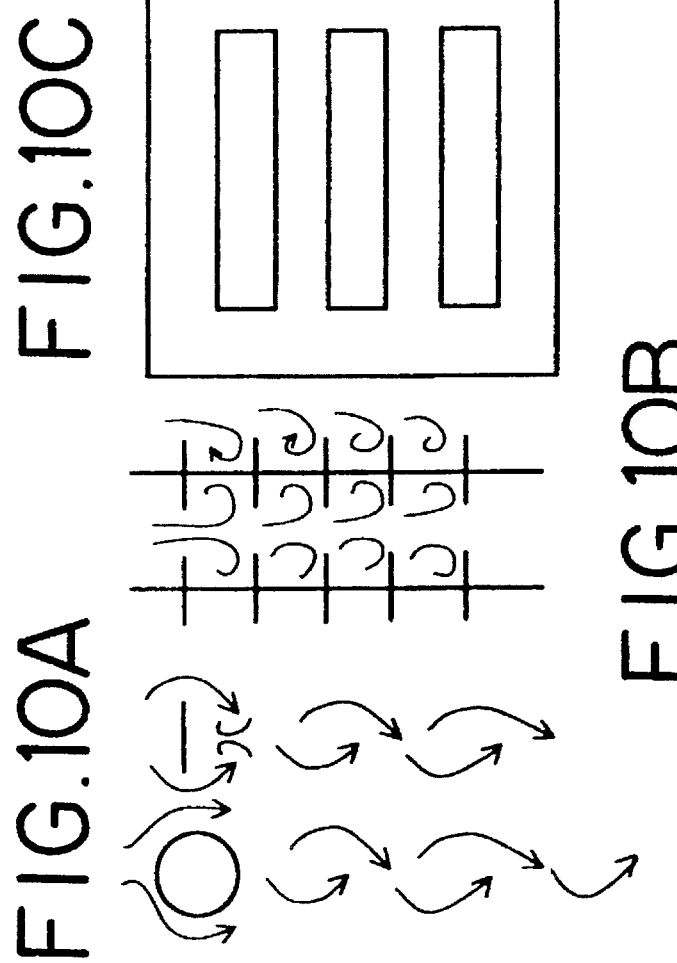

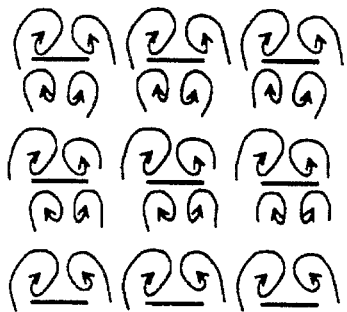
FIG.11A
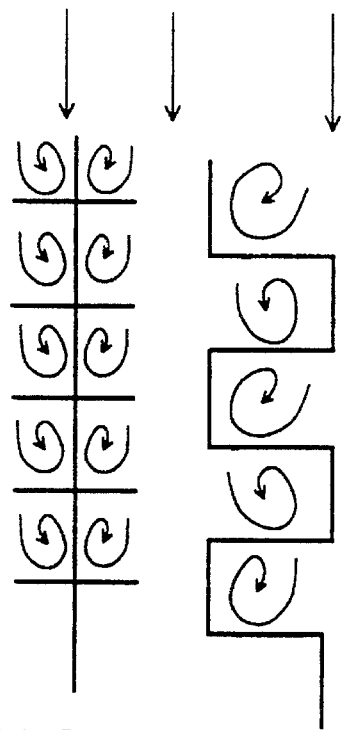
FIG.11B
FIG.11C
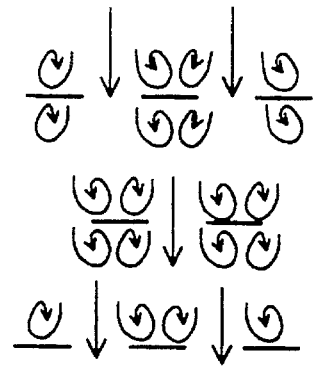
FIG.11D
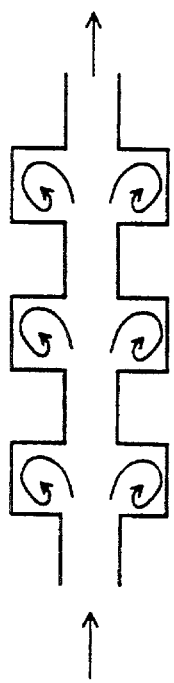
FIG.11E
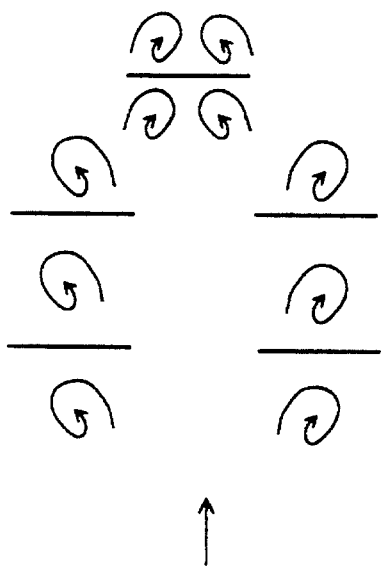
FIG.11F
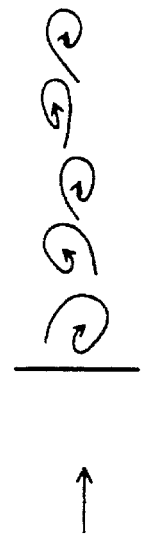
FIG.11G

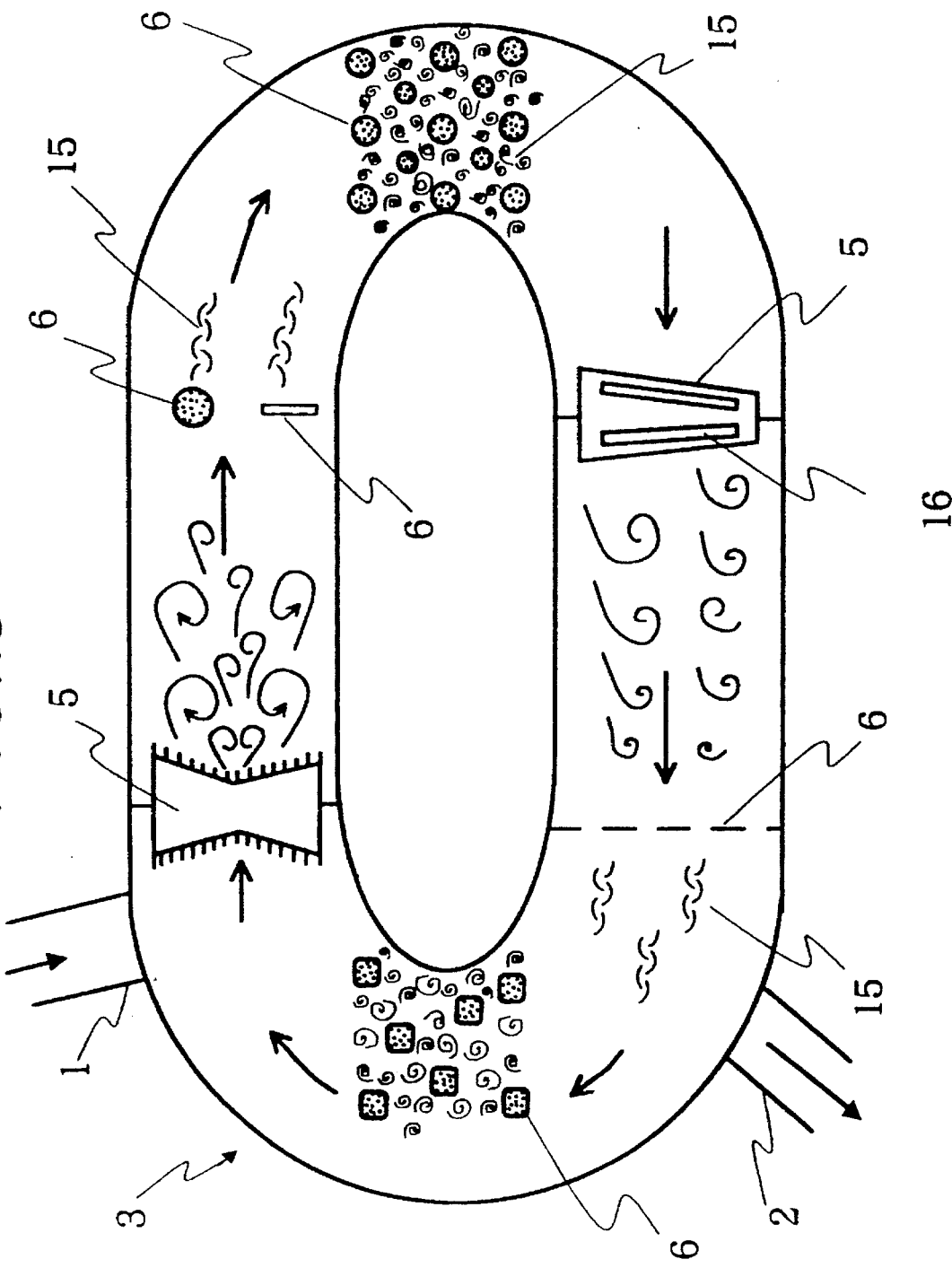

WATER TREATMENT DEVICE

BACKGROUND OF THE INVENTION

1. Field of the Invention

The invention relates to a water treatment device, or more specifically relates to a water treatment device used for collection and removal of oil and suspended matter found in the treatment water, or for simple, reliable and efficient implementation of biological water treatment using microorganisms found in the treatment water, through forced generation of large currents in the form of circular currents, vertical vortices etc., and, in addition, small vortices in the form of turbulent flows, vortex lines, Hill's spherical vortices, vortex rings, Karman vortices, Taylor vortices etc., in the treatment water in the treatment tank.

The invention could be applied with effect to use as an equipment for water quality conservation at such facilities as rain water drainage pump stations, pump stations for combined sewers where rain water and sewage are drained through the same conduits, and at sewage treatment facilities.

2. Description of the Related Art

Water in rivers and lakes, as well as industrial and domestic wastewater, contains a large variety of impurities, including suspended matter such as oil and solids such as sand. The demand today for environmental conservation on a global scale calls for energy saving, centralization, efficiency and perfection in purification treatment of such water.

Methods used for purification treatment of water range from physical to chemical and biological treatment methods. In all cases, suspended matter such as oil and solids such as sand need to be removed as far as possible prior to purification treatment, as they are liable to directly or indirectly impair the purification treatment process.

Grit chambers and settling tanks have conventionally been used in removing sand and other solids in the treatment water, while screens and similar devices are normally used for the removal of suspended matter. The use, however, of settling tanks etc. is problematic in that such settling tanks etc. take up large sites and in that costly equipment with complex mechanisms are required for the removal of the sediments. When using screens for the removal of minute suspended solids, on the other hand, there arise problems such as the need for costly screens with fine meshes, and the problem of the blockage of the screens by the suspended solids.

As an improvement on the above-mentioned conventional technology, the Inventor has, in U.S. Pat. No. 5,246,583, proposed a low-cost and easy-to-handle solid-liquid separator, with which efficient solid-liquid separation is ensured by installing horizontally-rotating drums in vertical positions at approximate centers of settling tanks and treatment tanks for removal of oil and suspended matter at water treatment plants, and making use of the hydraulic characteristics of the flow generated in the treatment water by rotating the rotating drums.

With the solid-liquid separator, rapid and reliable separation of oil and solids from water is effected by rotating the rotating drums in the treatment water containing oil, solids etc. While, a significantly higher level of efficiency is, in fact, achieved in the separation of suspended matter such as oil and solids such as sand with the separator in comparison with conventional methods that do not utilize rotating drums, the level achieved in the separation of suspended matter may still not be adequate depending on the conditions at the installation positions. The separator has also been found wanting in its adaptability to water level fluctuation in treatment tanks.

Unlike chemical treatment methods which are liable to cause secondary pollution, biological wastewater treatment (water treatment) methods have been seeing wide application as an environment-friendly water treatment method. In the activated sludge process, for example, which is a typical biological treatment method, wastewater treatment is implemented in an aerobic environment by aerating the treatment water to raise the efficiency and speed of biological treatment. In the oxidation ditch method, instead of aeration, rotating drums are used to have the treatment water flow through a long water channel and have the treatment water absorb oxygen from the water surface while flowing through the channel. In other words, in these conventional methods, increasing the amount of oxygen entering the treatment water was seen as the only means of activating the microorganisms found in the wastewater, and with no other effective methods being found for activating microorganisms, there were limits to the extent to which one could hope to raise the efficiency of wastewater treatment.

SUMMARY OF THE INVENTION

The invention therefore aims to provide a water treatment device that is capable of effecting speedy and reliable separation and removal of such impurities as oil and other suspended matter and sand and other solids contained in the treatment water, both in those cases where the level of the treatment water remains constant in the treatment tank and where it fluctuates.

The invention also aims to provide a simple and low-cost water treatment device on which the efficiency of biological treatment is raised by forced generation of fast and slow currents in the incessantly flowing treatment water in the treatment tank, thus creating environments that are favorable to the activation of microorganisms and enlivening the microorganisms by giving them oxygen and causing them to move and rest.

The above aim is achieved by the invention described below. The invention provides for a water treatment device which comprises a treatment tank with an inlet and outlet for the treatment water and a rotating drum used for forced generation of a primary current and a secondary current accompanying the primary current in the treatment tank, and characterized by its mechanism for collection and removal of oil and/or other suspended matter in the above-mentioned treatment water through the rotating action of the rotating drum; and a water treatment device which comprises a treatment tank with an inlet and outlet for the treatment water, an agitator used for forced generation of a primary current and a secondary current accompanying the primary current in the treatment tank and one or more flow interruptors installed on the flow path of the primary current and/or the flow path of the secondary current; and characterized by the mechanism whereby the flow interruptor is used to generate at will continuous, intermittent or fluctuating vortices in the current to activate microorganisms found in the treatment tank by causing them to move and rest, and thus cause the microorganisms to produce secretions of the desired quality.

The generation, through the rotating action of the rotating drum, of the primary and secondary currents in the treatment water leads to a speedy and reliable separation of matter such as oil and other suspended matter and sand and other solids in the treatment water. The installation of appropriate flow interruptors (which should be understood to refer in general to any object causing disturbance of the current) in the flow paths of the primary current and the secondary current accompanying it leads to the generation of disturbances and countless small vortices in the form of the so-called vortex lines, Hill's spherical vortices, vortex rings, Karman vortices, Taylor vortices etc., which in turn causes microorganisms to undergo rotational movement, as well as causing microorganisms found in the treatment water to rest in the regions of gentle flow created by the vortices, thus activating the microorganisms to produce secretions of the desired quality and improving the biological treatment effect on the treatment water.

Why the device of the above invention leads to an improvement of the biological purification treatment effect is not clear, but is thought to be as follows. The microorganisms found in the treatment water possess the ability to move through the use of their flagella and cilia, and have the habit of undergoing continuous motion. As a means of aiding this movement of microorganisms, countless vortices of varying sizes are generated incessantly in addition to the primary and secondary currents in the water treatment device of the invention; this serves to create an environment, whereby the microorganisms are able to rest in the regions where the flow becomes gentle, and after resting to exhibit greater activity.

BRIEF DESCRIPTION OF THE DRAWINGS

FIG. 5 is an outline plan view of an example of water treatment facilities utilizing the water treatment device of the invention.

FIGS. 10(a)–10(d) show outline drawings illustrating the flow interruptors utilized in the water treatment device of the invention and the vortices generated by them.

FIGS. 11(a)–11(g) show outline drawings illustrating the flow interruptors utilized in the water treatment device of the invention and the vortices generated by them.

FIG. 13 is an outline drawing illustrating a case where the water treatment device of the invention is applied to oxidation ditch biological treatment.

DETAILED DESCRIPTION OF THE INVENTION AND PREFERRED EMBODIMENTS

Figure 1A:
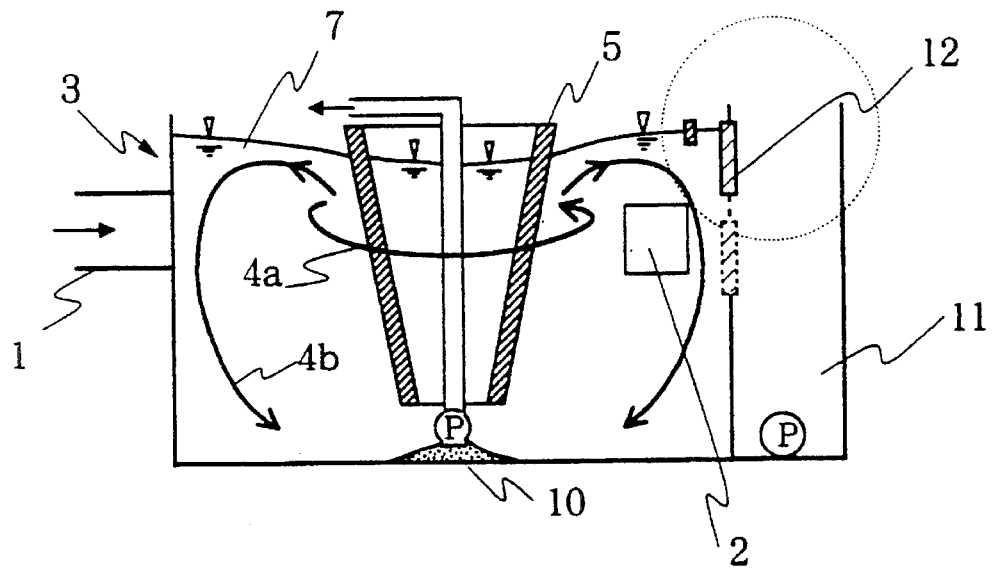
FIGS. 1(a)–1(c) are outline drawings illustrating a case where the water treatment device of the invention is applied to solid-liquid separation.

The invention is explained in greater detail below with reference to the desirable examples illustrated in the drawings.

As shown in FIG. 1(a), the water treatment device of the invention is characterized by its composition from a treatment tank (3) having an inlet (1) and an outlet (2) for the treatment water (7), and a rotating drum (5) used for forced generation of the primary current (4a) and the secondary current (4b) accompanying the primary current 4(a).

In the invention, the rotating drum (5) with at least one of its top, middle or bottom diameter differing from the other two is installed, as shown for example in FIG. 1(a), in the treatment water (7) in the treatment tank (3), and is made to rotate horizontally by a driving mechanism (not shown in the figure) such as a motor attached to the treatment tank (3), so as to generate the primary current (4a), which is a rotational current, and the secondary current (4b) accompanying the primary current (4a), which takes the form of a vertical vortex.

When the rotating drum (5) of the type shown in FIG. 1(a) is made to rotate horizontally, the primary current (4a) generated will take the form of a greater rotational current than when a cylindrical drum with no vertical variation in its diameter is used. The centrifugal force due to this strong rotational current causes the treatment water to beat against the tank walls, which raises the water level along the walls and generates a strong secondary current (4b).

Figure 2A:
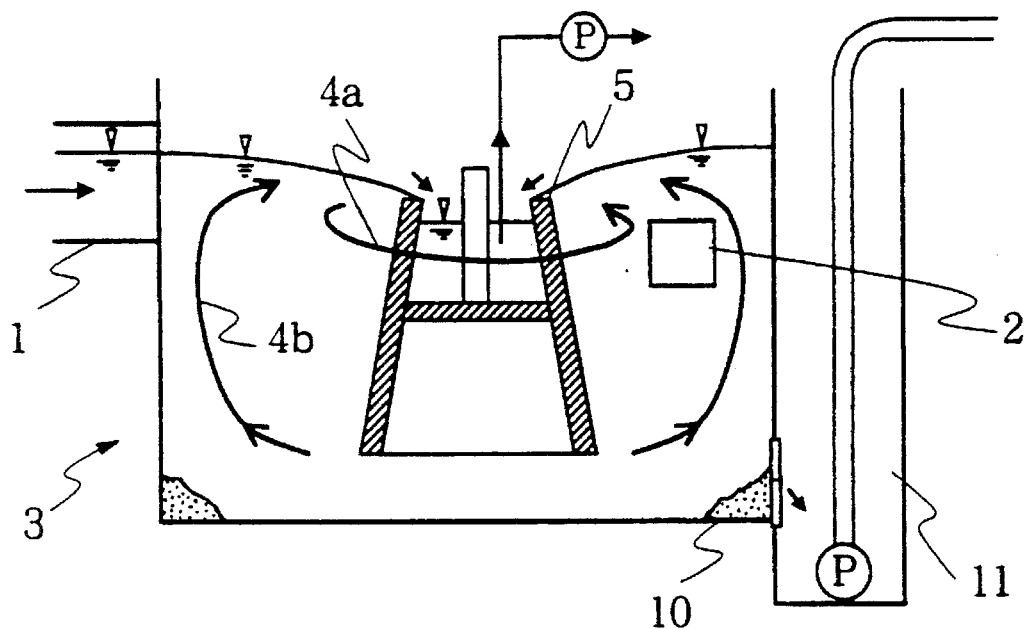
FIGS. 2(a)–2(b) are outline drawings illustrating a case where the water treatment device of the invention is applied to solid-liquid separation.
Figure 2B:
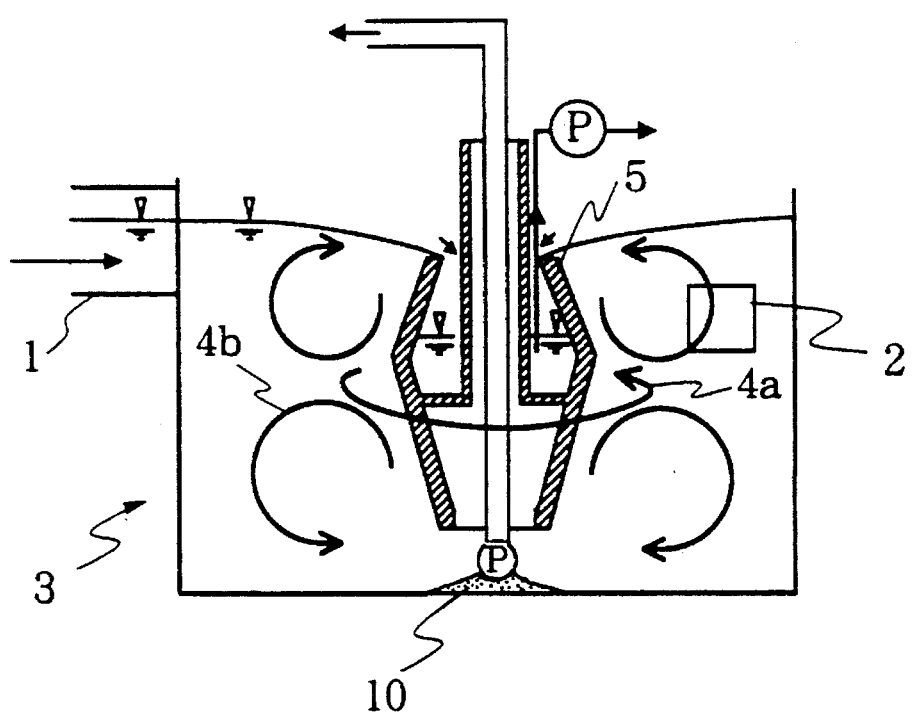

The rotating drum (5), which characterizes the invention, may take any form so long as it is capable of rotating at various speeds as required in the treatment water. The drum (5) may take various external shapes besides the shape illustrated in FIG. 1(a). Satisfactory results may be obtained either with drums displaying a continuous variation in its diameter, as shown in FIGS. 1(a) and 2(a), or with a drum the variation in whose diameter is not continuous, as shown in FIG. 2(b). Various other external shapes the rotating drum used in the invention may take are illustrated in FIGS. 6(a)–6(f). By using these drums with differing shapes, one can generate strong secondary currents (4b) in the form of the vertical vortices with the various configurations shown in the figure, and by doing so, cause the oil, suspended matter etc. rising to the surface layer of the treatment water to gather either near the top of the rotating drum or near the walls of the treatment tank.

When, for example, the rotating drum (5) used has a large top diameter, as shown in FIG. 1(a), the movement of the treatment water due to its rotation will cause sand and other solids (10), with their large specific gravity, to gather at the center of the tank bed, while the surface flow of the strong secondary current will cause oil and other suspended matter, with their small specific gravity, found near the surface of the treatment water to flow towards the walls of the treatment tank (3). Sand and other solids (10) gathering at the center of the tank bed are removed with equipment such as sand pumps from the system for disposal.

Oil and other suspended matter, on the other hand, are subjected to the required treatment after being made to overflow from the tank by the means described below. When using a drum (5) with a large top diameter, it is desirable to create a pit (11) for suspended matter immediately on the outside of the treatment tank (3), and to install a gate (12) on the partition between the pit (11) and the treatment tank (3), which should be made vertically mobile. By doing so, the gate (12) can be placed at the optimum position in relation to the water level in the treatment tank (3), and by placing the opening of the gate in the zone downwards from the water surface level, one can easily cause the water near the top, which contains large quantities of oil and other suspended matter and should be removed (referred to below as "removal water"), to overflow from the treatment tank (3). The removal water will then enter the suspended matter pit (11) and can be removed thence, for example, with the pump (P).

Figure 1B:
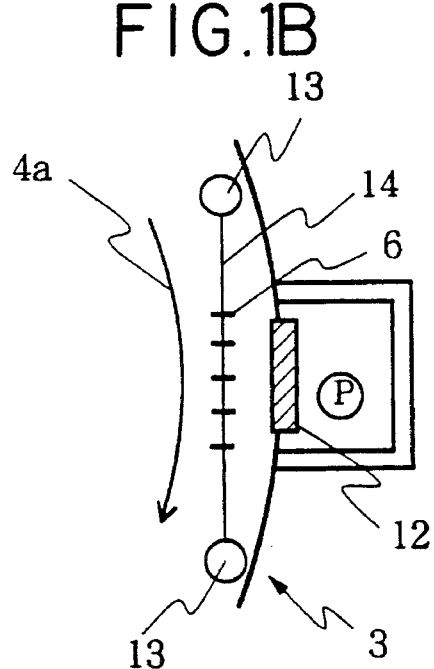
Figure 1C:
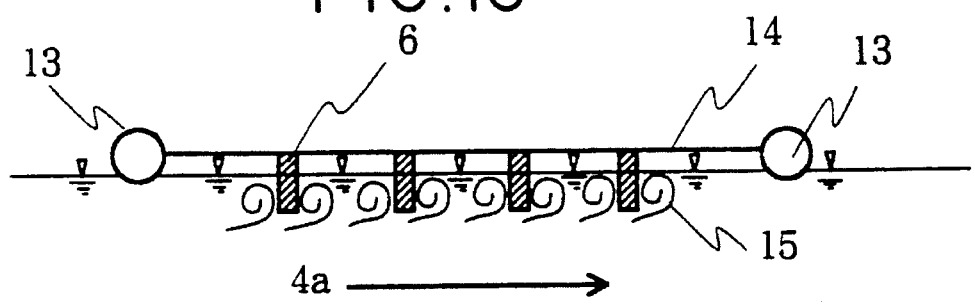

In the water treatment device of the invention, shown in FIGS. 1(a)–1(c), it is desirable to have a pair of floats (13) floating on the surface of the treatment water (7), a connecting rod (14) connecting the floats (13) and a plural number of flow interruptors (6) fixed to the connecting rod (14) installed on the inside of the treatment tank (3) walls, as shown in FIGS. 1(b) and 1(c). This will lead to the generation of small vortices (15) in the vicinity of the flow interruptors (6), which will cause the oil and other suspended matter to be easily drawn towards the flow interruptors (6), leading to greater completeness and facility in transferring the oil and other suspended matter from the surface of the treatment water into the pit (11).

Figure 3A:
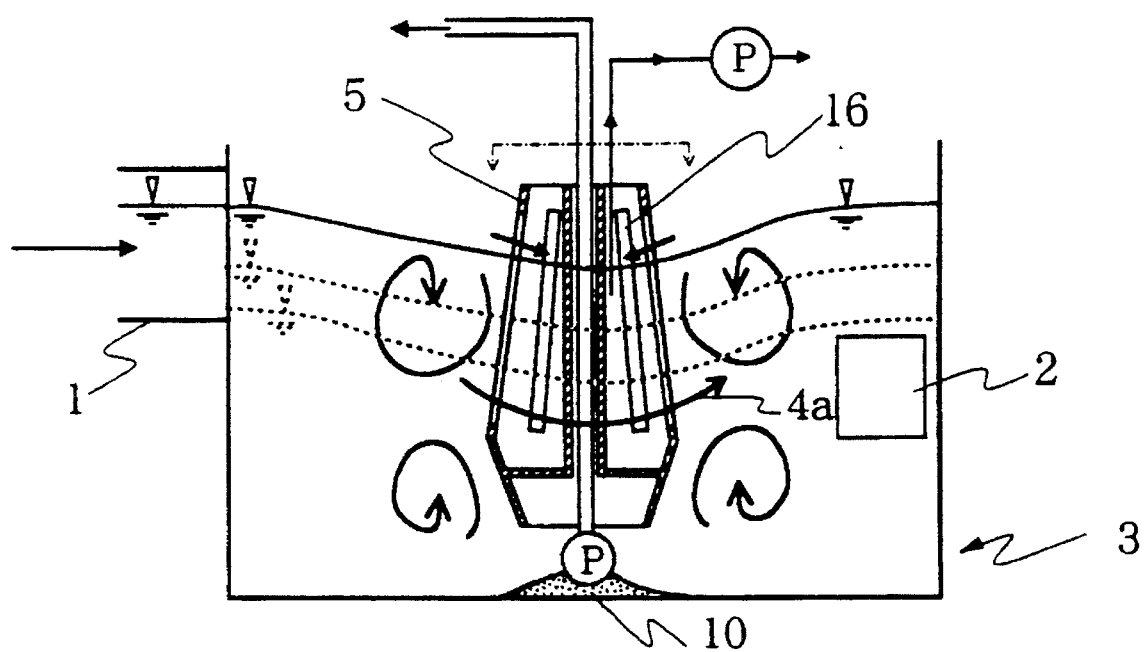
FIGS. 3(a)–3(b) are outline drawings illustrating a case where the water treatment device of the invention is applied to solid-liquid separation.
Figure 3B:
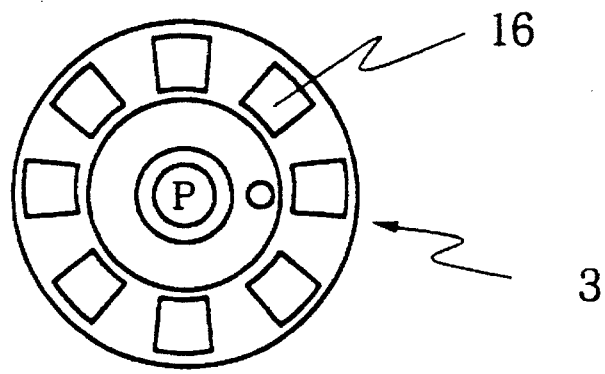

When the surface level of the treatment water in the treatment tank (3) is subject to fluctuation, it is desirable to utilize a rotating drum (5), whose top diameter is smaller than the diameter in its other parts and whose side walls have been provided with slit-type perforations (16), as shown in FIGS. 3(a) and 3(b), and to have the water treatment device composed in such a way as to ensure that the removal water will gather at the center of the treatment tank (3). So long as their purpose is achieved, the perforations (16) need not necessarily have the shape of vertical slits, as shown in FIG. 3(a), but may also take the form of a number of horizontal slits located at various vertical positions on the side walls of the drum (5).

For pumping out the removal water collecting inside the drum (5) with the pump (P) installed above it, it is desirable to utilize a suction device that can be moved up and down with the variation in the water level and whose inlet faces upwards towards the water surface so as to allow only the removal water to be pumped out.

Figure 4A:
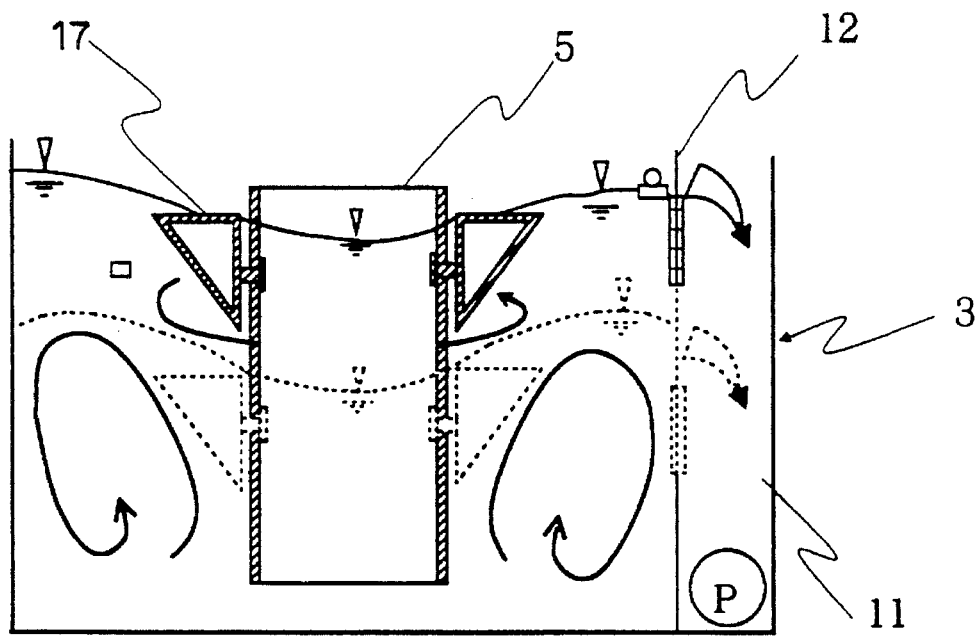
FIGS. 4(a)–4(b) are outline drawings illustrating a case where the water treatment device of the invention is applied to solid-liquid separation.
Figure 4B:
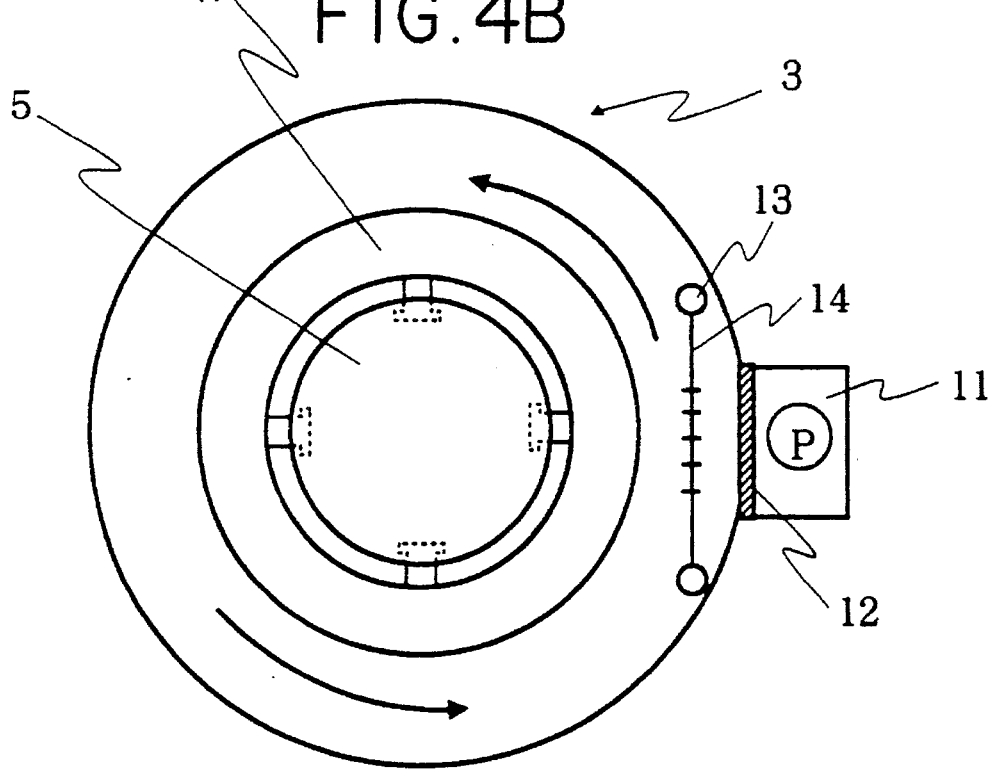
Figure 6A:
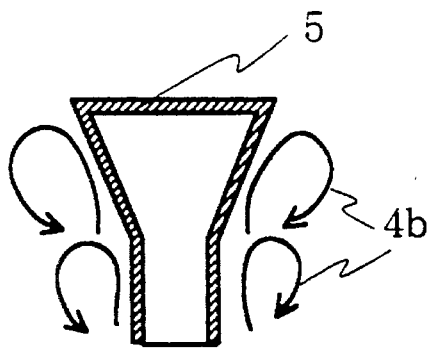
FIGS. 6(a)–6(f) are outline sectional views of rotating drums which is a component of the water treatment device of the invention.
Figure 6B:
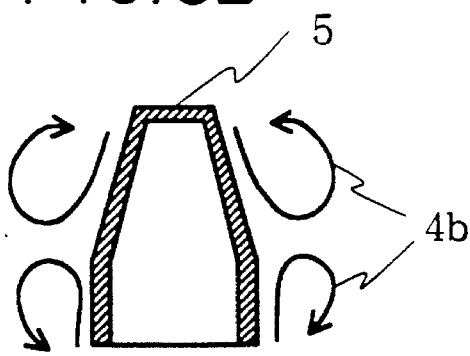
Figure 6C:
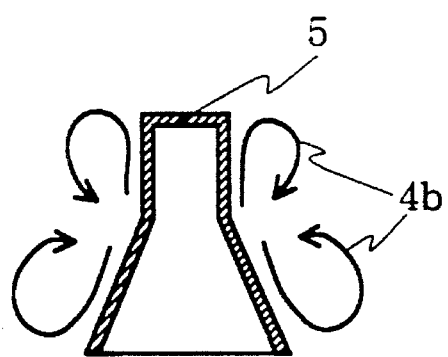
Figure 6D:
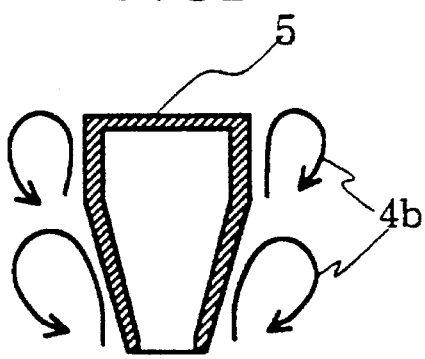
Figure 6E:
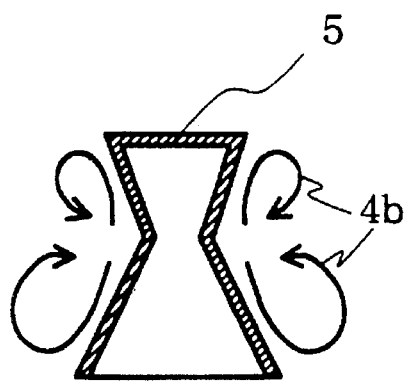
Figure 6F:
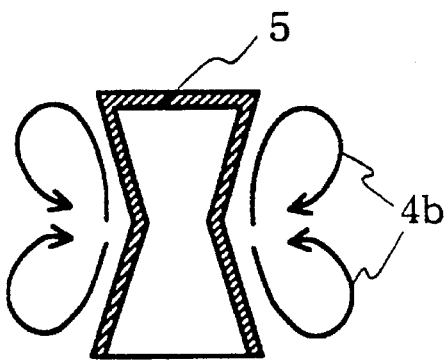

In the device of the invention, one can also attach floating rings (17), which can be made to move up and down along the side walls of the drum (5) with the variation of the water level in the treatment tank (3), on the outside of the rotating drum (5) with a uniform diameter, as shown in FIGS. 4(a) and 4(b), so as to create a partial enlargement in the diameter of the composite body made out of the drum and the floating rings. With this arrangement, the floating rings (17) will always be positioned near the surface of the treatment water in the treatment tank (3), as indicated for example with the dotted lines in FIG. 4(a), and will rotate together with the rotating drum (5) in this position. Even if the surface level of the treatment water is altered, the rotational current near the top of the treatment water will be stronger than that near the bottom of the treatment water in the treatment tank (3). As a result, in the case where a rotating drum (5) with floating rings (17) is used too, a strong primary current and a strong secondary current accompanying the primary current will be generated as in the cases discussed above, ensuring reliability in the separation of the removal water containing large quantities of oil etc. from the treatment water and allowing their transfer into the suspended matter pit (11) and their subsequent disposal. The plan shape of the floating rings (17) may either be circular as shown in FIG. 4 (b) or elliptical (not shown in the figure). The rotating drum with floating ring used in the invention may be replaced by a rod-shaped drum, which, though less efficient, provides a less costly structure.

The water treatment device of the invention is constructed by installing the rotating drums (5) of various shapes as discussed above in the treatment tank (3). The rotating drum (5) may be positioned at or near the center of the treatment tank, as shown in FIGS. 4(a) and 4(b) and as is the case in conventional methods, or at an eccentric position in the tank as shown in FIG. 5. When the drum is installed at an eccentric position, unlike when it is installed at or near the center, the rotational current (4a), which is the primary current will be irregular, and the vertical vortex (not shown in the figure), which is the secondary current accompanying the primary current (4a), will also be irregular. As a result, the flow patterns in the treatment tank (3) will include not only the primary current and the secondary current produced by it, but also complex combinations of disturbances and vortices, and these will produce stagnant regions in the treatment water, which is desirable as removal water with high concentrations of oil and other suspended matter may be found gathering in these stagnant regions. The plan shape of the treatment tank too, therefore, need not be circular, but may be elliptical as shown in FIG. 5, or polygonal or that of a long water channel.

Other conditions pertaining to the desirable examples of the treatment tank (3) include the installation of the inlet (1) at a mid-level along the depth of the water when the objects to be separated from the treatment water have a high specific gravity, and at a shallow position when the objects to be separated have a low specific gravity. The inflow direction of the treatment water should desirably be positioned along the tangent of the circumference of the treatment tank (3) to minimize the disturbance in the flow of the treatment water in the treatment tank (3) and so as to make the treatment water entering the treatment tank (3) flow along the walls of the treatment tank (3).

The component materials, capacities etc. of the treatment tank (3) should be altered as required in accordance with the conditions of the treatment water, or in other words, according to the treatment site, the quantity of treatment water and the types and quantities of oil, solids etc. contained in it. The treatment tank (3) might, for example, be made of concrete, metallic materials such as steel or copper plates, plastics such as hard vinyl chloride resin, wood or far infrared radiation ceramics, and will normally have a capacity of 0. 5 to 500 m³, but this need not necessarily be the case.

In those cases where the treatment water is transferred elsewhere for further treatment after treatment in the treatment tank (3), spatial considerations relating to the treatment facilities as a whole often make it more desirable to install the rotating drums mentioned above at an eccentric position in the treatment tank (3).

The rotating drum (5) used in the water treatment device of the invention may be driven, when for example the rotating drum (5) stands vertically in the tank (3), by a motor situated to the side of the drum with gears attached on the periphery of the top of the drum (5), or, if such an arrangement does not cause any problems, a drum (5) with a central shaft may be used and the central shaft may be suspended from a support allowing its free rotation.

Such a rotating drum (5) will have a diameter corresponding to around 10 to 30% of the diameter of the treatment tank (3), and its length may be altered as required in accordance with the size, depth etc. of the treatment tank (3), or in accordance with the relationship between the required treatment capacity and power costs. Where necessary, two or more drums may be installed in series or in parallel in a single treatment tank (3). In view of its corrosion-resistance requirements etc., the rotating drum (5) should desirably be made of corrosion-resistant materials such as stainless steel, materials generating electromagnetic waves, or anti-bacterial materials such as copper.

As discussed above, the water treatment device of the invention will cause impurities with high specific gravity, such as sand, in the treatment water to gather on the tank bed, and oil and suspended matter with their low specific gravity to gather near the top of the treatment water, thus greatly reducing the amount of oil and other suspended matter and sand and other solids contained in the water treated. By utilizing the device of the invention, therefore, in the pretreatment process at a sewage treatment plant, for example, and implementing the various purification processes subsequently, one can greatly improve the efficiency of the purification treatment process at the sewage treatment plant in comparison with conventional methods. The water treatment device of the invention is most suited to use as the treatment tank for activated sludge treatment, as the reaction tank in chemical treatment, or as the pretreatment tank for such treatment systems. By utilizing the water treatment device of the invention at such facilities as ordinary rain water drainage pump stations or at pump stations for combined sewers where rain water and sewage are drained through the same conduits, one can improve the quality of the water discharged into public bodies of water as a part of the work for water quality conservation in public waters, which has become a major problem in recent years.

Next, an explanation is presented below concerning the application of the water treatment device of the invention, aimed at a major improvement in the efficiency of biological water treatment. The device consists of a treatment tank with an inlet and an outlet for the treatment water, an agitator used for forced generation of a primary current and a secondary current accompanying the primary current in the treatment water in the treatment tank, and one or more flow interruptors installed on the flow path of the primary current and/or the flow path of the secondary current. On this device, the flow interruptor is used to generate at will continuous, intermittent or fluctuating vortices in the current to activate microorganisms found in the treatment tank by causing them to move and rest, and thus cause the microorganisms to produce secretions of the desired quality.

That is, by installing flow interruptors such as round bars, square bars and perforated plates in the flow paths of the primary and/or secondary currents generated by the rotation of rotating drums (5) of the type discussed above or other types of agitators, one can create small vortices such as Karman vortices, as well as pockets of gentle flow without vortices away from the flow interruptors in the treatment water. By continuously or intermittently supplying the necessary oxygen to microorganisms in the treatment water in such conditions, one can invigorate the activity of microorganisms by forcing them to move and to rest, and so obtain treated water of an improved quality.

Figure 7A:
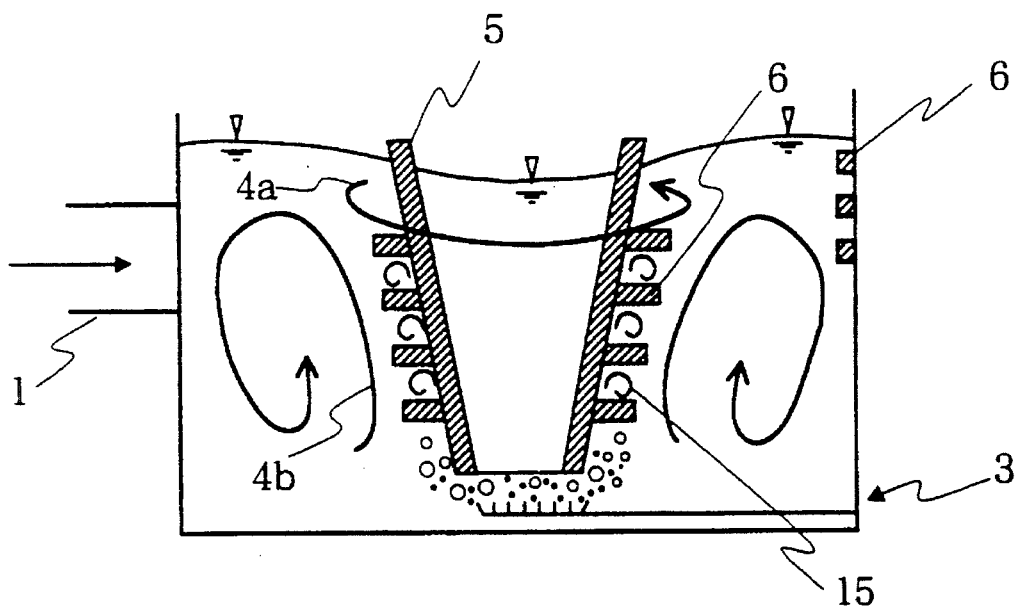
FIGS. 7(a)–7(b) are outline drawings illustrating a case where the water treatment device of the invention is applied to biological treatment.
Figure 7B:
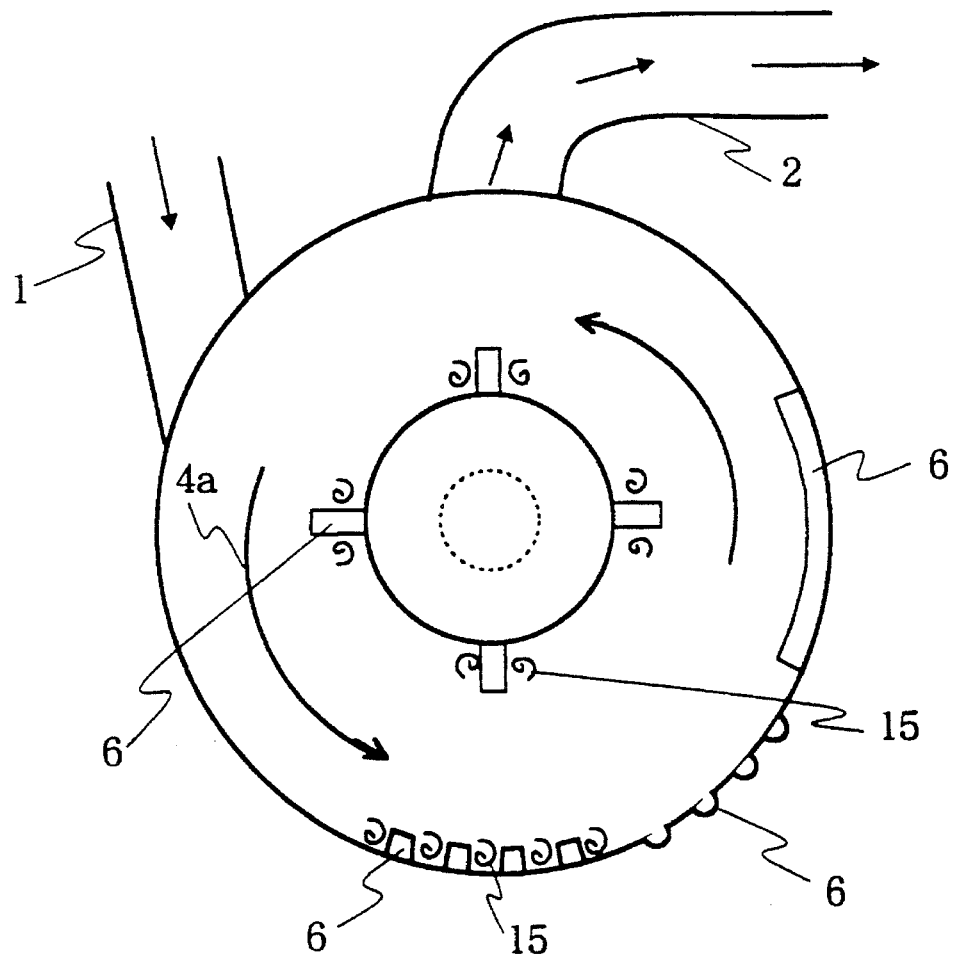

In the example illustrated in FIG. 7(a), flow interruptors (6) comprising bar-shaped objects have been installed on the outer face of the rotating drum (5), which is a type of agitator, along with uneven-surfaced flow interruptors (6) on the side walls of the tank. Small vortices (15) are generated in the vicinity of these flow interruptors (6) as shown in FIG. 7(b).

Figure 8A:
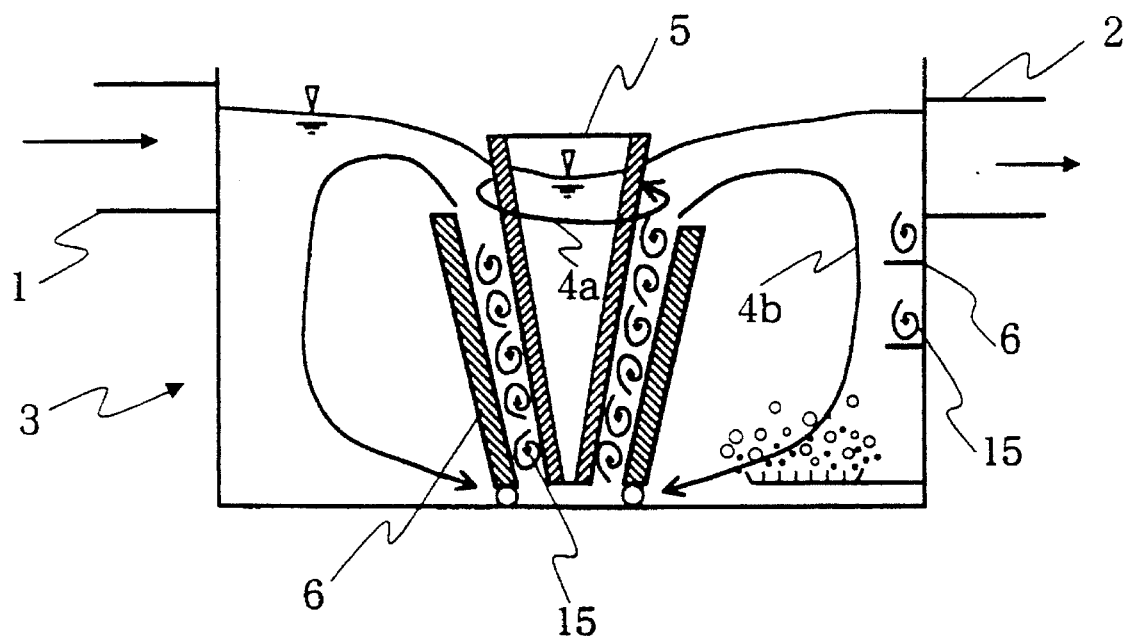
FIGS. 8(a)–8(b) are outline drawings illustrating a case where the water treatment device of the invention is applied to biological treatment.
Figure 8B:
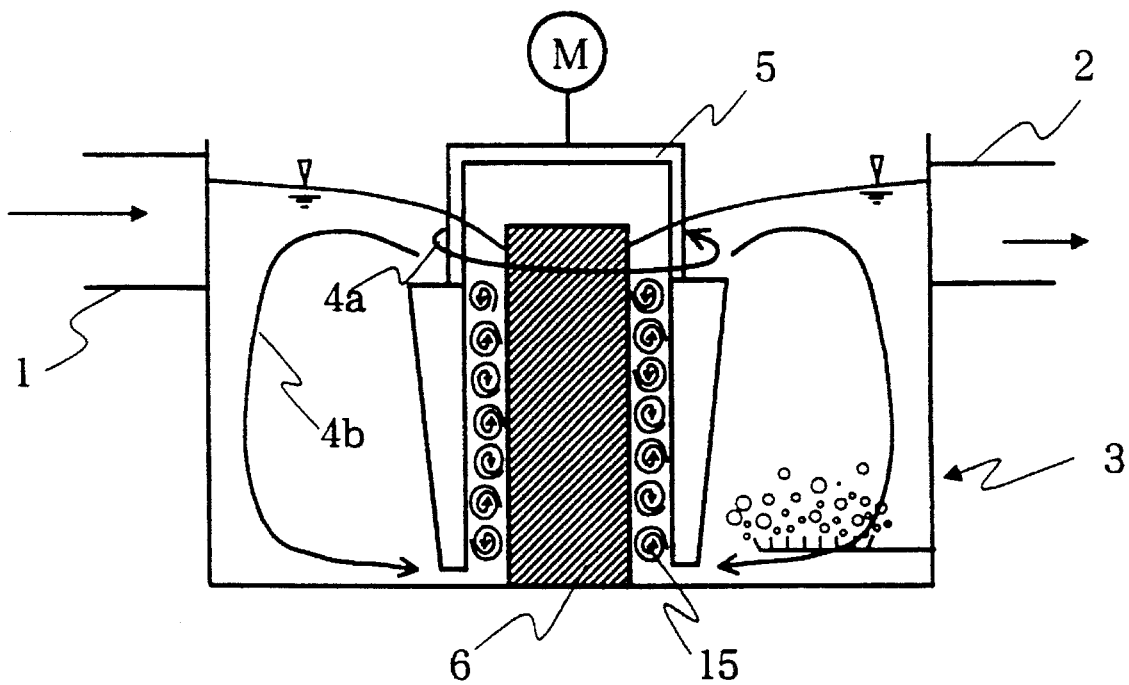

If fixed wall-shaped flow interruptors (6) are installed, as shown in FIG. 8(a), on the outer face of the rotating drum (5) in such a manner as to create gaps between them and the outer face of the rotating drum (5), or if a cylindrical flow interruptor (6) is fixed, as shown in FIG. 8(b), to the tank bed inside the rotating drum (5) in such a manner as to create a narrow gap between the inner face of the rotating drum (5) and the outer face flow interruptor (6), regular Taylor vortices (15) are generated in these gaps.

Figure 9A:
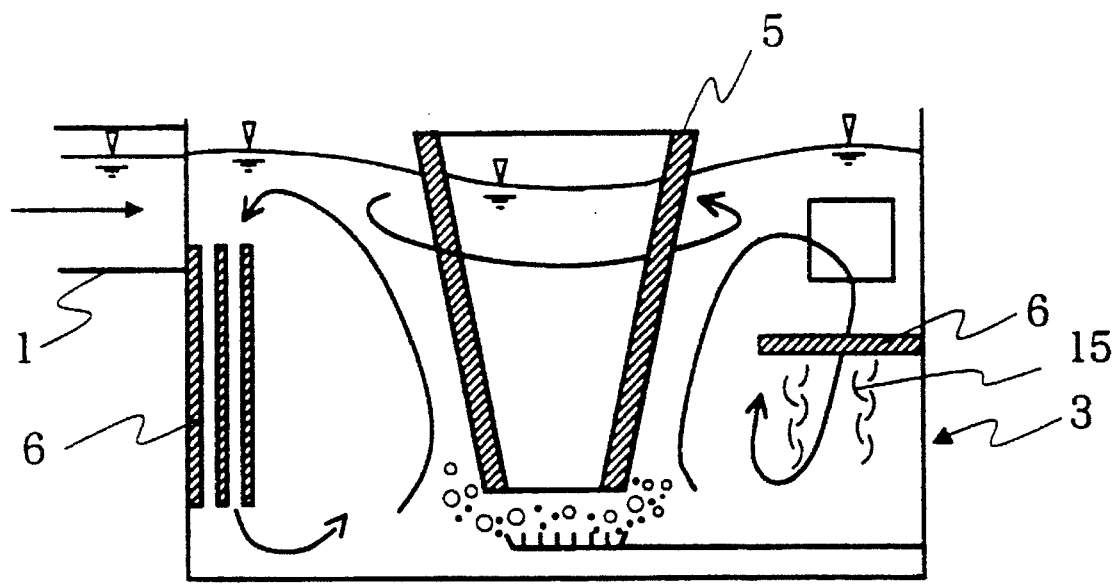
FIGS. 9(a)–9(b) are outline drawings illustrating a case where the water treatment device of the invention is applied to biological treatment.
Figure 9B:
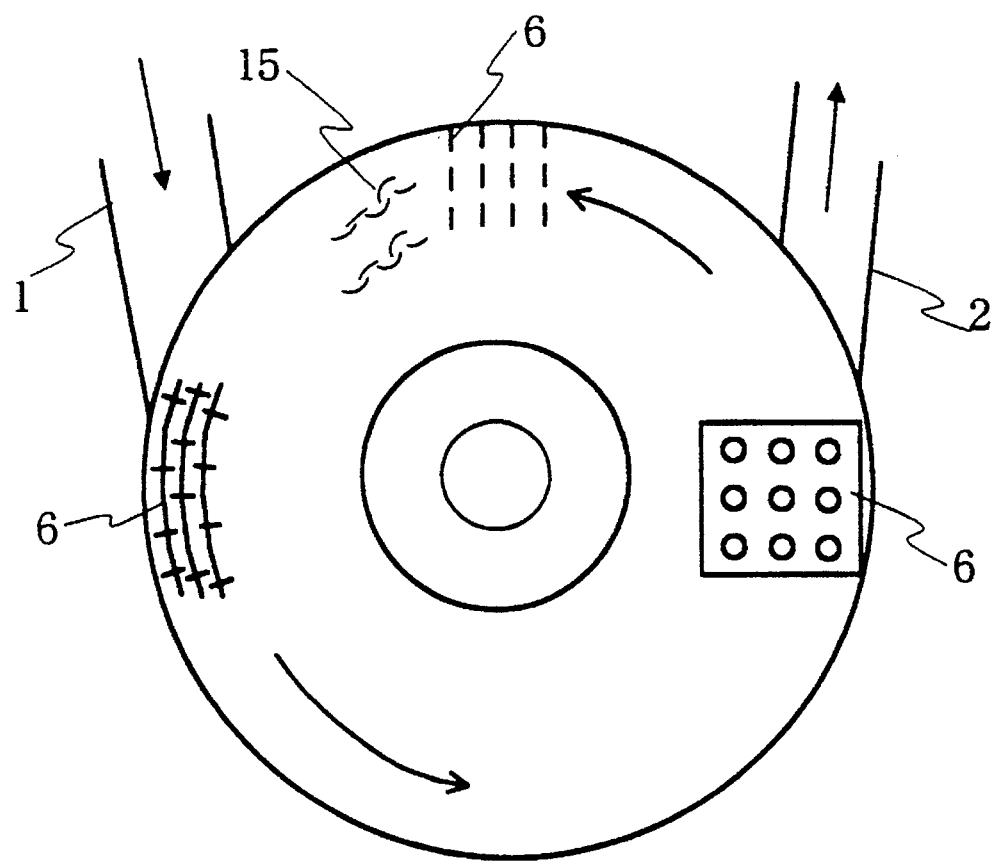
Figure 12A:
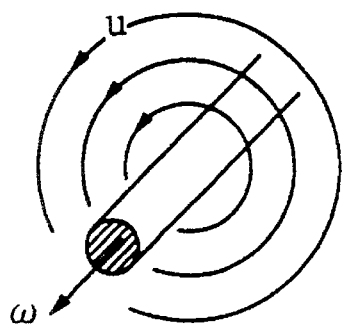
FIGS. 12(a)–12(d) show outline drawings illustrating types of vortices.
Figure 12B:
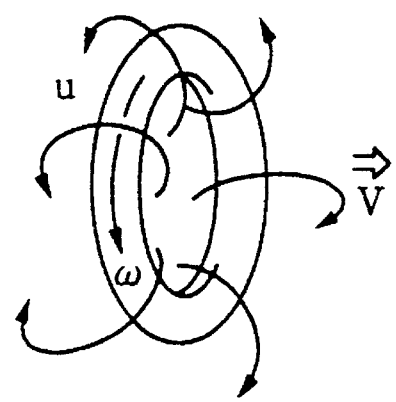
Figure 12C:
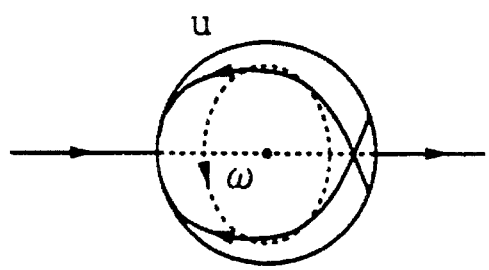
Figure 12D:
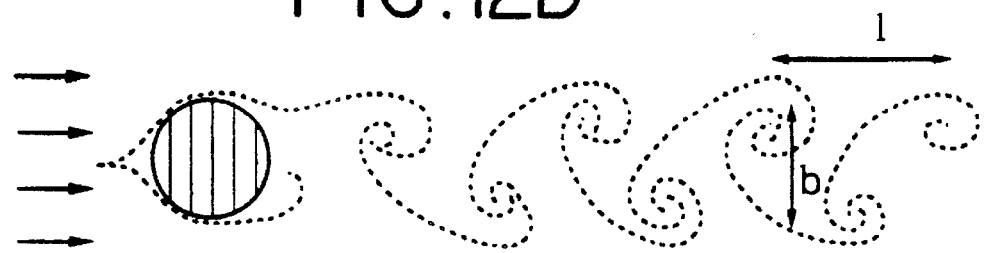

In the example illustrated in FIG. 9(a), flow interruptors (6) of various shapes, such as round bars and flat plates, are installed on the flow paths in the treatment tank (3). The flow interruptors may be positioned, for example, on the wall faces of the tank as shown in FIGS. 9(a) and 9(b), or at various other positions inside the tank.

While the flow interruptors may take the various shapes shown in FIGS. 9(a)–9(b), 10(a)–10(d) and 11(a)–11(g), the installation of these flow interruptors (6) in the paths of the rotational current, which is the primary current, or the vertical vortex, which is the secondary current, will result in the generation of disturbances and various types of regular or irregular vortices illustrated in FIGS. 10(a)–10(d) and 11(a)–11(g). Typical forms which vortex lines, Hill's spherical vortices, vortex rings, Karman vortices and Taylor vortices take are shown in FIGS. 12(a)–12(d).

In the examples of application for the water treatment device of the invention, in which the flow interruptors of various shapes discussed above are installed on the tank walls, inside the tank or on the rotating drum (5), in addition to the larger flows, namely the rotational current, which is the primary current, and the vertical vortex, which is the secondary current, small vortices, such as the rows of Karman vortices illustrated in FIGS. 11(a)–11(g), are generated inside these larger flows, and currents of varying types and strengths are generated incessantly throughout the treatment water in the treatment tank (3). As a result the necessary oxygen is distributed throughout the treatment tank (3) either through absorption from the surface of the treatment water or through diffusion from the tank bed; at the same time, microorganisms are made to actively undergo rotational movement etc. by the vortices in the treatment tank (3), while in those regions where the vortices become weaker and the flow becomes gentler, the microorganisms are able to rest, and thus an environment is provided which is favorable to the habitation of microorganisms and which serves to render the microorganisms more healthy and vigorous. This setup serves to invigorate the activity of microorganisms and thus leads to an improvement in the purification effect on wastewater.

The oxidation ditch method is one of the methods conventionally used for biological purification treatment of wastewater. In this method, which is a type of long-term aeration method using activated sludge, aerators are installed on circular water channels and the wastewater is purified through aeration while circulating on the channels. The devices used may be of the horizontal shaft, vertical shaft, or draft tube type. In one of its applications, horizontally-placed rotating drums (5), a type of agitator, are made to rotate on a treatment tank in the shape of a long channel (doughnut-shaped) as shown in FIG. 13, and oxygen is absorbed into the treatment water from its surface while the treatment water (e.g. wastewater) is made to circulate on the channel.

When the invention is applied to this oxidation ditch method, the rotating drum (5) may, naturally, be of the conventional and widely-used cylindrical type; it is more desirable to use rotating drums (5) of the type illustrated in FIGS. 1(a), 2(a)–2(b) and 6(a)–6(f), with at least one of top, middle or bottom diameters differing from the other two. To give a brief explanation of the example illustrated in FIG. 13, unlike in the examples explained so far, in which the rotating drums (5) are installed vertically in the treatment tank (3), in this example, the rotating drums (5) of the type described above are installed horizontally. As a result, when the hourglass-shaped rotating drum (5) is made to rotate as shown in FIG. 13, strong primary currents are generated near the walls of the circular channel where the diameter of the rotating drum (5) is larger, while a weaker primary current is generated near the center of the circular channel. As secondary currents will then be generated heading from where the primary current is strong to where it is weak, a complex pattern of vortices including vertical and horizontal vortices and differing from those on normal circular currents will be found generated on the circular channel.

Figure 14A:
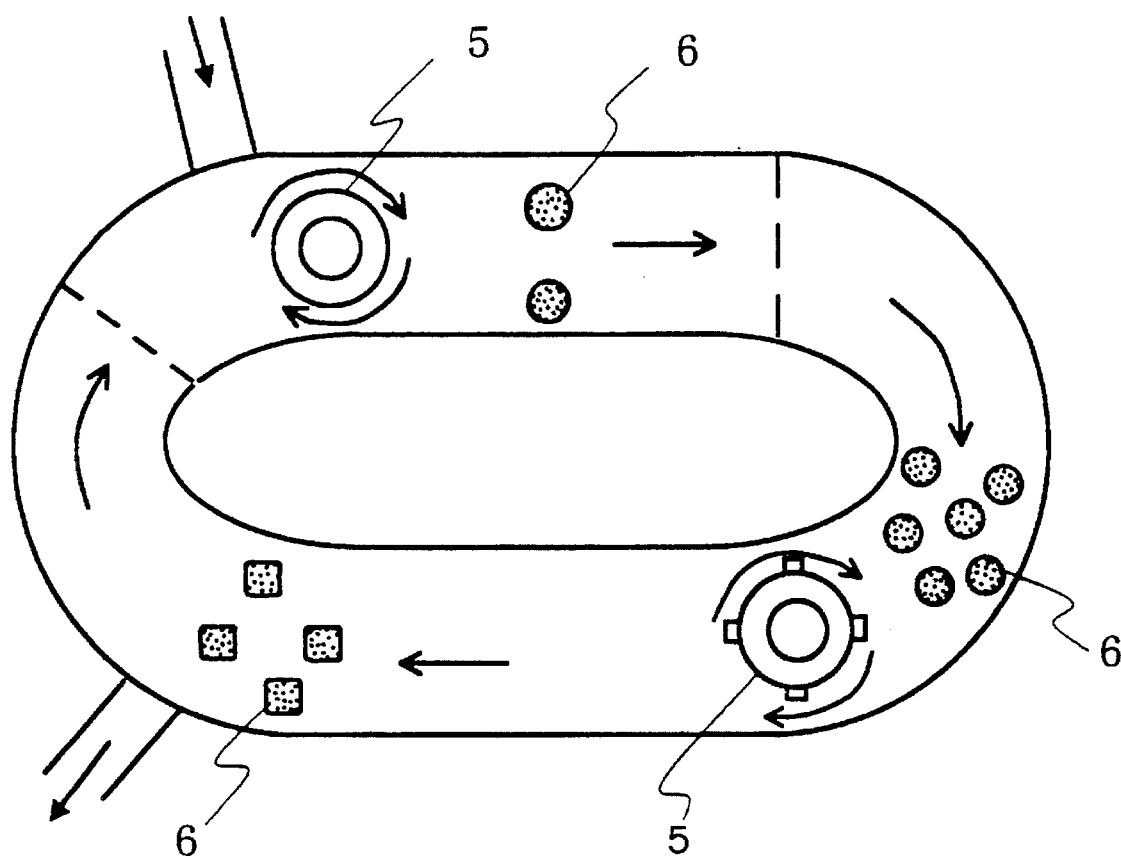
FIGS. 14(a)–14(b) show outline drawings illustrating another case where the water treatment device of the invention is applied to oxidation ditch biological treatment.
Figure 14B:
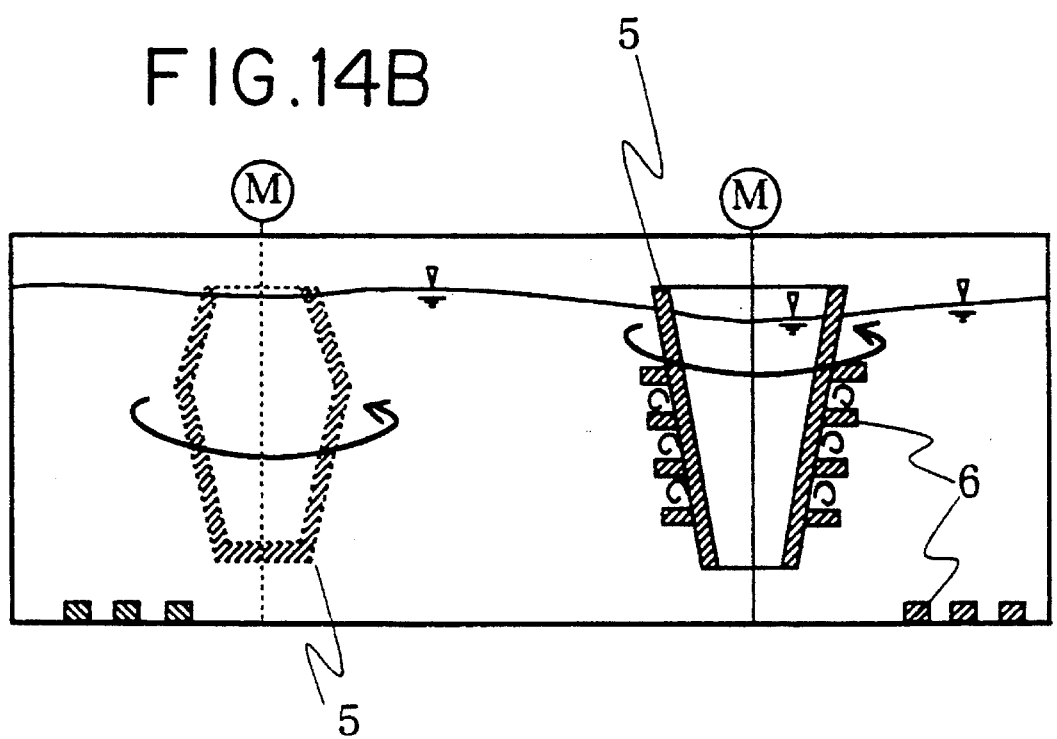

In the example illustrated in FIGS. 14(a)–14(b), as in the cases discussed above, the rotating drums (5) are installed vertically on the circular channel. In this case, as has been explained with reference to FIGS. 7 to 9, the rotation of the rotating drums (5) will result in the generation of a horizontal rotational current, which is the primary current, and vertical vortices, which are the secondary currents accompanying this. In this case too, as in the case just described, as the flow on the circular channel is circulatory, more complex patterns of vortices etc. will be generated than in the cases illustrated in FIGS. 7(a)–7(b) to 9(a)–9(b).

Furthermore, as flow interruptors (6) of various shapes are installed in the flow in the device of the invention, as in the cases described above, small vortices of various types, such as Karman vortices, will be generated in addition. As illustrated in FIGS. 13 and 14(a)–14(b), the flow interruptors (6) may be installed on the paths of the primary or secondary currents on the circular channel, on the face of the rotating drums, on the tank walls, or on the tank bed.

In the oxidation ditch biological water treatment device to which the invention is applied, various flow patterns similar to those in the rapids and pools on natural rivers can be created by making special considerations in the design on positions and shapes of the flow interruptors installed on the circular water channel and rotating drums (5), and more efficiently, for example, through intermittent operation of the device thus designed. In other words, conditions similar to those in the natural world can be provided for the biological activities of the microorganisms in the treatment water. As a result, in the oxidation ditch biological water treatment device to which the invention is applied, microorganisms are made to undergo rotating motion etc. and to rest in the gentle-flow regions where the vortices have disappeared, and the environment in the treatment region is thus rendered favorable to the habitation of microorganisms.

Where the invention is applied to the activated sludge process and other biological treatment methods, it is desirable that the treatment tank for water treatment should possess an inlet (1) of the types shown in FIGS. 7(a)–7(b), 8(a)–8(b) and 9(a)–9(b) for the reception of the treatment water, entering the treatment tank either by natural flow or by being force-fed with pumps etc. (not shown in the figures), and an outlet (2) for the discharge of the treated water, as well as being provided with a diffusion mechanism for air for forced dissolution of oxygen in the treatment water. So long as the capacity of the tank is appropriate, there are no restrictions concerning its shape, be it circular, rectangular or elliptical. When, as illustrated in FIGS. 13 and 14(a)–14(b) for example, the oxidation ditch biological purification treatment method is used, the treatment tank used will be of a long-channel type (doughnut-shaped) with a long ditch.

As has been explained above, the invention makes possible the easy and speedy separation of the "removal water," containing large quantities of oil and other suspended matter, and sand and other solids through the actions of the primary current and the accompanying secondary current generated in the treatment tank. The separation effect can be further improved through the use of small vortices generated by installing flow interruptors.

The application of the invention also makes it possible to provide environments favorable to the habitation of microorganisms by creating flow patterns similar to those on rapids and pools on natural rivers, which serves to invigorate the activity of microorganisms, and thus to markedly accelerate the purification action due to microorganisms and to markedly improve the efficiency of biological purification treatment.

I claim:

1. A water treatment device comprising:
    a treatment tank having a top end and a bottom end located below the top end, said treatment tank further having an inlet and an outlet for treatment water; and
    a rotating drum positioned in a treatment water in the treatment tank;
    wherein:
    a rotation of said rotating drum in said treatment water creates a primary current in said treatment tank which is a rotational current that causes material in said treatment water having a first specific gravity to gather at the center of the bottom end of the treatment tank, and a secondary current in said treatment tank which defines a vertical vortex in a direction that is approximately perpendicular to a direction of rotation of said rotating drum and causes material in said treatment water with a second specific gravity which is smaller than the said first specific gravity and suspended matter in said treatment water to flow to a surface of the treatment water and thereafter to side walls of the treatment tank;
    wherein the rotating drum has a top portion with a first diameter, a middle portion located below said top portion with a second diameter, and a bottom portion located below said middle portion with a third diameter, such that at least one of said first, second and third diameters is different from the other two diameters.

2. A water treatment device according to claim 1, wherein a plan shape of the treatment tank is circular, elliptical, polygonal, or channel shaped.

3. A water treatment device according to claim 2, wherein the rotating drum is located at the center of the treatment tank.

4. A water treatment device according to claim 2, wherein the rotating drum is located at an off-center position of the treatment tank.

5. A water treatment device according to claim 1, wherein an overflow tank is positioned on an outside of the treatment tank for receiving overflow water from the treatment tank which includes the material with the second specific gravity and the suspended matter.

6. A water treatment device comprising:

a treatment tank having a top end and a bottom end located below the top end, said treatment tank further having an inlet and an outlet for treatment water;

an agitator positioned in the treatment tank for a forced generation of a primary current which is a rotational current and a secondary current which defines a vertical vortex in a direction that is approximately perpendicular to the rotational current in said treatment tank; and at least one flow interrupter installed on a flow path of at least one of the primary current and the secondary current so as to generate continuous, intermittent or fluctuating vortices in the at least one primary current and secondary current for causing oil and suspended matter in treatment water in the treatment tank to be drawn towards the flow interruptors;

wherein the agitator comprises a rotating drum which has a top portion with a first diameter, a middle portion located below said top portion with a second diameter, and a bottom portion located below said middle portion with a third diameter, such that at least one of said first, second and third diameters is different from the other two diameters.

7. A water treatment device comprising:

a treatment tank having a top end and a bottom end located below the top end, said treatment tank further having an inlet and an outlet for treatment water; and a rotating drum positioned in a treatment water in the treatment tank;

wherein:

a rotation of said rotating drum in said treatment water creates a primary current in said treatment tank which is a rotational current that causes material in said treatment water having a first specific gravity to gather at the center of the bottom end of the treatment tank, and a secondary current in said treatment tank which defines a vertical vortex in a direction that is approximately perpendicular to a direction of rotation of said rotating drum and causes material in said treatment water with a second specific gravity which is smaller than the said first specific gravity and suspended matter in said treatment water to flow to a surface of the treatment water and thereafter to side walls of the treatment tank;

wherein:

the rotating drum has a top portion with a first diameter, a middle portion located below said top portion with a second diameter, and a bottom portion located below said middle portion with a third diameter, such that each of said first, second and third diameters are equal to each other;

the rotating drum has a rotational axis which is substantially perpendicular to the bottom end of said treatment tank; and the rotating drum comprises a floating ring positioned on a periphery of the rotating drum, said floating ring being movable in a vertical direction on the periphery of the rotating drum along a direction of the rotational axis of the rotating drum so as to adapt a position of the floating ring to a water level of the treatment water in the treatment tank, the floating ring rotating together with the rotating drum so as to increase an intensity of the primary and secondary currents.

8. A water treatment device comprising:

a treatment tank having a top end and a bottom end located below the top end, said treatment tank further having an inlet and an outlet for treatment water;

an agitator positioned in the treatment tank for a forced generation of a primary current which is a rotational current and a secondary current which defines a vertical vortex in a direction that is approximately perpendicular to the rotational current in said treatment tank; and at least one flow interrupter installed on a flow path of at least one of the primary current and the secondary current so as to generate continuous, intermittent or fluctuating vortices in the at least one primary current and secondary current for causing oil and suspended matter in treatment water in the treatment tank to be drawn towards the flow interruptors;

wherein:

the agitator comprises a rotating drum which has a top portion with a first diameter, a middle portion located below said top portion with a second diameter, and a bottom portion located below said middle portion with a third diameter, such that each of said first, second and third diameters are equal to each other;

the rotating drum has a rotational axis that is substantially perpendicular to the bottom end of said treatment tank; and the rotating drum comprises a floating ring positioned on a periphery of the rotating drum, the floating ring being movable in a vertical direction on the periphery of the rotating drum along a direction of the rotational axis of the rotating drum so as to adapt a position of the floating ring to a water level of the treatment water in the treatment tank, the floating ring rotating together with the rotating drum so as to increase an intensity of the primary and secondary currents.

9. A water treatment device comprising:

a treatment tank having a top end and a bottom end located below the top end, said treatment tank further having an inlet and an outlet for treatment water;

an agitator positioned in the treatment tank for a forced generation of a primary current which is a rotational current and a secondary current which defines a vertical vortex in a direction that is approximately perpendicular to the rotational current in said treatment tank;

at least one flow interruptor installed on a flow path of at least one of the primary current and the secondary current so as to generate continuous, intermittent or fluctuating vortices in the at least one primary current and secondary current for causing oil and suspended matter in treatment water in the treatment tank to be drawn towards the flow interruptors; and a pair of floats which float on a surface of the treatment water and a connecting rod which connects said pair of floats, wherein a plurality of said flow interruptors are fixed on said connecting rod.

10. A water treatment device comprising:

a treatment tank having a top end and a bottom end located below the top end, said treatment tank further having an inlet and an outlet for treatment water;

an agitator positioned in the treatment tank for a forced generation of a primary current which is a rotational current and a secondary current which defines a vertical vortex in a direction that is approximately perpendicular to the rotational current in said treatment tank; and at least one flow interruptor installed on a flow path of at least one of the primary current and the second current so as to generate continuous, intermittent or fluctuating vortices in the at least one primary current and secondary current for causing oil and suspended matter in treatment water in the treatment tank to be drawn towards the flow interruptors;

wherein the flow interruptors are installed either on a peripheral surface of the agitator or near side walls of the treatment tank, said flow interruptors having a shape of round or angular bars or flat plates.

* * * * *